(12) United States Patent
Danielou

(10) Patent No.: US 11,479,205 B2
(45) Date of Patent: Oct. 25, 2022

(54) DUAL STAGE INFLATOR

(71) Applicant: AUTOLIV ASP, INC., Ogden, UT (US)

(72) Inventor: Romain Danielou, Bountiful, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/203,880

(22) Filed: Mar. 17, 2021

(65) Prior Publication Data

US 2022/0297632 A1 Sep. 22, 2022

(51) Int. Cl.
*B60R 21/264* (2006.01)
*B60R 21/263* (2011.01)

(52) U.S. Cl.
CPC .. *B60R 21/2644* (2013.01); *B60R 2021/2633* (2013.01); *B60R 2021/2648* (2013.01)

(58) Field of Classification Search
CPC . B60R 21/263; B60R 21/2644; B60R 21/264; B60R 2021/2642; B60R 2021/2633
See application file for complete search history.

(56) References Cited

U.S. PATENT DOCUMENTS

| 6,189,927 B1 | 2/2001 | Mossi et al. |
| 2003/0146611 A1 | 8/2003 | Kenney et al. |

(Continued)

FOREIGN PATENT DOCUMENTS

JP  2001225712 A  8/2001

OTHER PUBLICATIONS

International Search Report and Written Opinion regarding International Patent Application No. PCT/US2022/019433, dated Jun. 22, 2022.

*Primary Examiner* — Barry Gooden, Jr.
(74) *Attorney, Agent, or Firm* — Harness, Dickey & Pierce, P.L.C.; Stephen T. Olson

(57) ABSTRACT

A dual stage inflator a dual stage inflator for an inflatable vehicle safety device includes a housing defining a first chamber containing a first gas generant material. An ignitor cup is disposed in the first chamber and defines an interior containing an ignitor material. A first ignitor device extends into the interior of the ignitor cup. A combustion cup and a lid are disposed in the first chamber and cooperate to define a second chamber containing a second gas generant material. The combustion cup includes a cup sidewall extending between a first axial end and a second axial end. The first axial end is an open end. The lid is normally in a closed position relative to the combustion cup to close the open end of the combustion cup and is moveable away from the combustion cup in response to an increase of pressure within the combustion cup for venting combustion gas out of the combustion cup. A second ignitor device extends into the combustion cup and closes the second axial end of the combustion cup. The combustion cup includes a first axially extending portion adjacent the first axial end having a first outer diameter and a second axially extending portion adjacent the second axial end having a second outer diameter greater than the first outer diameter. The lid includes a lid sidewall extending in an axial direction and radially overlapping at least a portion of the combustion cup including the first outer diameter.

17 Claims, 4 Drawing Sheets

(56) References Cited

U.S. PATENT DOCUMENTS

| | | | |
|---|---|---|---|
| 2007/0120349 A1* | 5/2007 | Hoffman | B60R 21/2644 |
| | | | 280/741 |
| 2013/0283760 A1* | 10/2013 | Kobayashi | F42B 3/04 |
| | | | 60/39.12 |
| 2017/0166160 A1* | 6/2017 | Izuma | B60R 21/264 |

* cited by examiner

DUAL STAGE INFLATOR

FIELD

The present disclosure generally concerns an inflator for providing inflation gases for an inflatable vehicle safety device, such as an inflatable airbag. More particularly, the present disclosure concerns a dual stage inflator for an inflatable vehicle airbag.

BACKGROUND

This section provides background information related to the present disclosure which is not necessarily prior art.

Inflatable occupant restraints or airbags are commonly included on motor vehicles to provide impact protection for occupants of the motor vehicle. In the event of an accident, one or more sensor within the vehicle measure abnormal deceleration, for example, and triggers inflation of the airbag within a few milliseconds with gas produced by a device commonly referred to as an "inflator". The inflated airbag cushions and protects the motor vehicle occupant from impact forces.

Various types of inflators have been disclosed in the art for the inflation of airbags. One known inflator devices is shown and described in commonly assigned U.S. Pat. No. 6,189,927 (the '927 patent). The inflator of the '927 patent is an adaptive pyrotechnic inflator, or dual stage inflator, having gas generant materials in two chambers. The gas generant materials are independently activated by two ignition devices. The gas generant material-containing chambers of such ignitors may be referred to as "combustion chambers" as the gas generant material therein is combusted or otherwise reacted to produce gas used to inflate an associated occupant restraint. U.S. Pat. No. 6,189,927 is hereby incorporated by reference as if fully set forth herein.

While known inflators for inflatable occupant restraints, including the inflator of U.S. Pat. No. 6,189,927, have generally proven to be suitable for their intended uses, a continuous need for improvement in the relevant art remains.

SUMMARY

This section provides a general summary of the disclosure, and is not a comprehensive disclosure of its full scope or all of its features.

It is a general object of the present teachings to provide a dual stage inflator with a combustion cup including a lid and having an increased volume for gas generant loading.

In accordance with one particular embodiment, the present teachings provide a dual stage inflator for an inflatable vehicle safety device including a housing defining a first chamber containing a first gas generant material. An ignitor cup is disposed in the first chamber and defines an interior containing an ignitor material. A first ignitor device extends into the interior of the ignitor cup. A combustion cup and a lid are disposed in the first chamber and cooperate to define a second chamber containing a second gas generant material. The combustion cup includes a cup sidewall extending between a first axial end and a second axial end. The first axial end is an open end. The lid is normally in a closed position relative to the combustion cup to close the open end of the combustion cup and is moveable away from the combustion cup in response to an increase of pressure within the combustion cup for venting combustion gas out of the combustion cup. A second ignitor device extends into the combustion cup and closes the second axial end of the combustion cup. The combustion cup includes a first axially extending portion adjacent the first axial end having a first outer diameter and a second axially extending portion adjacent the second axial end having a second outer diameter greater than the first outer diameter. The lid includes a lid sidewall extending in an axial direction and radially overlapping at least a portion of the combustion cup including the first outer diameter.

In accordance with another particular embodiment, the present teachings provide an inflator for an inflatable vehicle safety device including a cup having a cup sidewall and an open end. The cup sidewall extends between a first axial end and a second axial end. A lid cooperates with the cup sidewall to define a combustion chamber. The lid normally closes the combustion chamber and is movable away from the cup sidewall to vent combustion gas from the combustion chamber. A gas generant is disposed in the combustion chamber. An ignition device extends into the combustion chamber. The cup includes a first axially extending portion adjacent the first axial end having a first outer diameter and a second axially extending portion adjacent the second axial end having a greater second outer diameter. The lid includes an axially extending lid sidewall extending in an axial direction and radially overlapping at least a portion of the cup including the first outer diameter.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
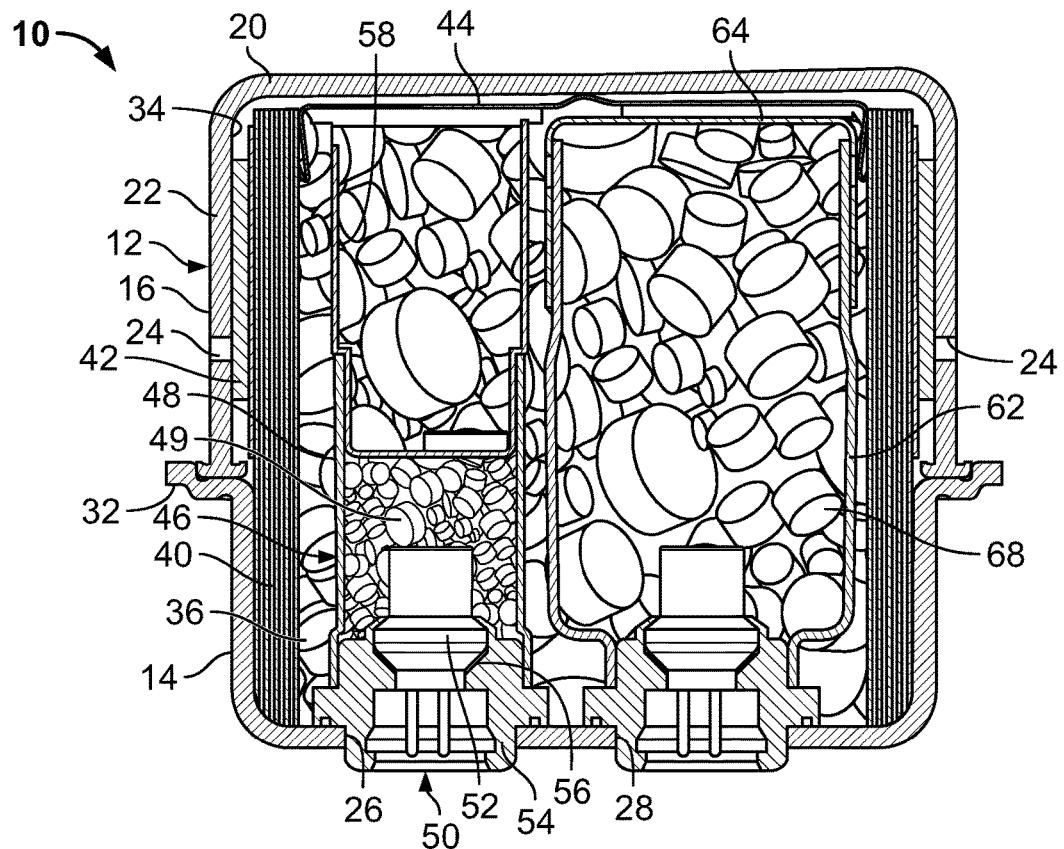
FIG. 1 is a cross-sectional view of an inflator for an inflatable vehicle safety device in accordance with the present teachings, the inflator shown prior to activation.
Figure 2:
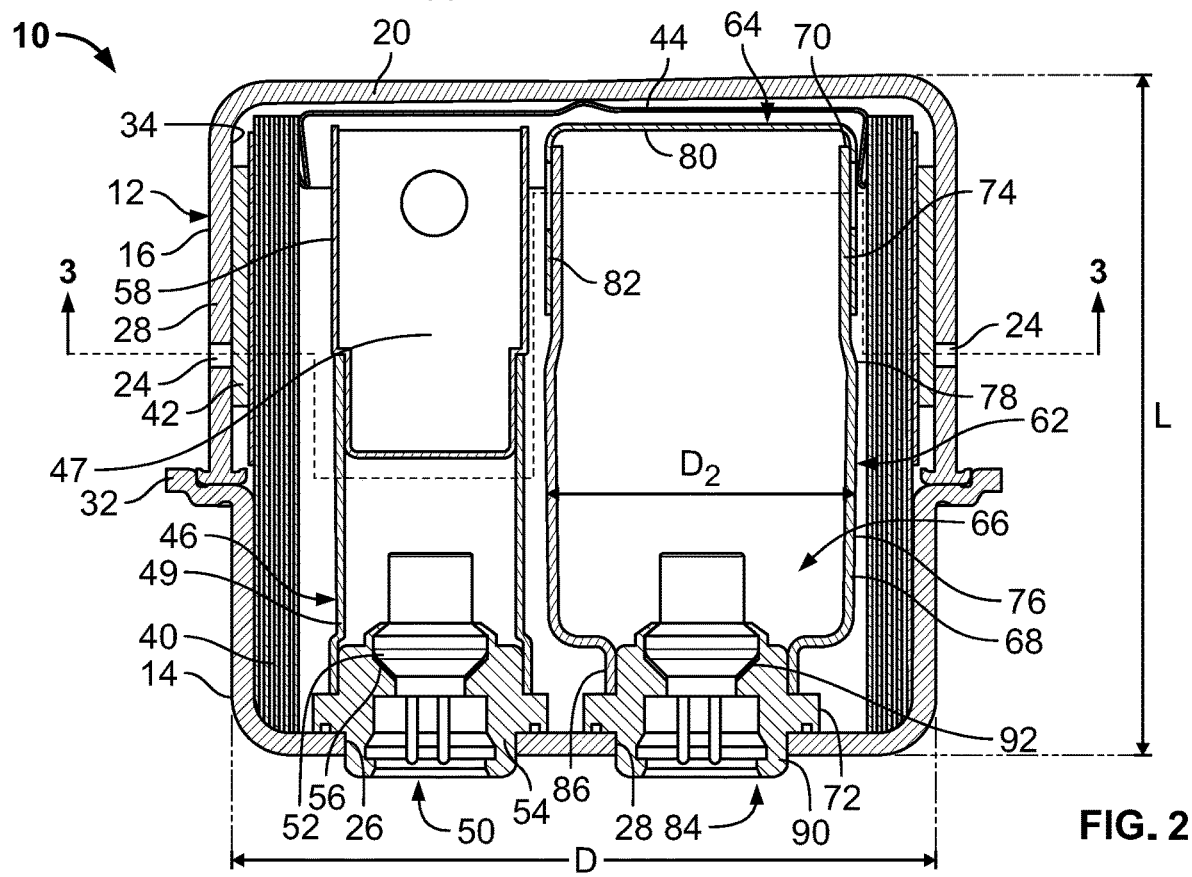
FIG. 2 is another cross-sectional view of the inflator of FIG. 1, the inflator shown without igniter materials and without gas generant materials for purposes of illustration.

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. "Exemplary" as used herein means serving as a typical or representative example or instance, and does not necessarily mean special or preferred.

With general reference to drawings, a dual stage inflator for an inflatable occupant protection device such as an airbag in accordance with the present teachings is illustrated and generally identified at reference character 10. The inflator 10 shown in the drawings is a dual-stage inflator particularly adapted for a passenger side front airbag. It will be understood, however, that various aspects of the present teachings may be readily adapted for use with driver side front airbags and other airbags.

The inflator 10 is generally illustrated to have a cylindrical external outline and to include a housing 12 formed of two structural components, i.e., a first housing portion or base portion 14 and a second housing portion or diffuser cap portion 16. As such, the housing 12 may have a generally circular cross section. The first and second housing portions 14 and 16 may be formed of aluminum or other suitable material and may be secured to one another by inertia welded, for example, and welding or otherwise suitably connected to one another. In the particular embodiment illustrated, the housing 12 may have a diameter of approximately 65.8 mm and a length L of approximately 68 mm.

As shown in the drawings, the second housing portion 16 may be considered an upper housing portion and the first housing portion 16 may be considered a lower housing portion. These descriptors (e.g., upper and lower) used with regard to the housing portions 14 and 16 and elsewhere herein with respect to other features or elements will be understood to merely provide an ease of reference to the drawings and will not be understood to be limiting. The second housing portion 16 is in the general shape of an inverted bowl and includes an end wall 20 and a cylindrical sidewall 22. The sidewall 22 includes a plurality of spaced gas exit ports 24.

The first housing portion 14 includes first and second mounting openings, designated by the reference numerals 26 and 28, respectively, the use of which will be discussed in greater detail below. The first housing portion 14 may be integrally formed to include a peripheral mounting bracket 32 that extends radially outward from the housing 12.

The housing 12 is configured to define a first chamber 34. The first chamber may be a generally cylindrical cavity 34. The first chamber 34 contains or houses a supply of a first gas generant material 36, typically in the form of a pyrotechnic, such as known for use in airbag inflators. Surrounding the first gas generant material 36 is a filter 40. The filter 40 may be formed of multiple layers or wraps of a metal screen. Surrounding the filter 40 and generally adjacent an inner surface of the sidewall 22 is an adhesive-backed foil seal 42. The adhesive-backed foil seal 42 may hermetically seal the gas generant material 36 within the inflator 10, thereby protecting the gas generant material from ambient conditions, such as moisture. The inflator 10 may also include a retainer 44 to retain the inflator components in proper relative arrangement within the inflator 10.

An ignitor cup 46 is disposed within the first chamber 34. As illustrated, the first igniter cup 46 defines an ignition chamber 47 and may include a cylindrical sidewall 48. An igniter material 49 is contained within the ignitor cup 46. A first igniter device 50 is mounted to the housing 12 in a location within the first chamber 34 via the first mounting opening 26. Insofar as the present teachings are concerned, it will be understood that the first igniter device 50 may take the form of a known pyrotechnic initiator device. As such the first igniter device 50 may include a squib 52, a squib adapter or holder 54, whereby the first igniter device 50, and a squib seal 56. The ignitor device 50 is conventionally mounted to or is mated with the housing 12 by the squib adapter or holder 54. The squib seal 56 conventionally seals the squib 52 with the adapter 54.

As shown, the igniter cup 46 may include an open upper end that is closed by a spacer member 58. The spacer member 58 may be generally cylindrical in shape with a closed lower end. The spacer member or igniter tube lid 58 may function to prevent the ignitor generant 49 from getting out of the igniter cup 46. This spacer member 58 has holes in the bottom that allow gases coming from the combustion to ignite the generant. Alternatively, the igniter cup 46 may be integrally formed to include a closed upper end.

The igniter cup 46 may be formed of a gas-impermeable material, such as metal, with the cylindrical sidewall 48 including a plurality of spaced, preferably, generally uniformly spaced gas exit orifices 60. The gas exit orifices 60 may be normally (e.g., when the inflator is in a static or prior to actuation state) covered and the passage of material therethrough prevented by a pressure sensitive covering or barrier, such as by an adhesive-backed foil seal wrap or the like as is well known in the art. As is known, the covering may be selected to open or rupture upon the application of a predetermined pressure from the interior of the igniter cup 46.

When actuated, ignition of the igniter material 49 results in an increase in pressure within an interior of the igniter cup 46 with the subsequent predetermined rupturing or opening of the covering to permit passage of ignition products produced by the combustion of the igniter material 49 through the exit orifices 60, from the first igniter device 50 to the gas generant material 36 contained within the first chamber 34. The resulting contact by or between the ignition products and the first gas generant material 36 results in the ignition and reaction of the first gas generant material 36. The inflation gases produced pass through the filter 40, rupture the foil seal 42 and pass through the gas exit ports 24 (as signified by the arrows A in FIG. 3) and out of the inflator 10 into an associated airbag cushion (not shown).

The first chamber 34 also houses or contains a combustion cup 62 or second stage cup and a lid 64. The combustion cup 62 and lid 64 cooperate to define a sub chamber or second chamber or combustion chamber 66. The second chamber contains a second gas generant material 68. The second gas generant material 68 may be in the form of a pyrotechnic material and may be either the same or different in composition, shape, size or form, as compared to the first gas generant material 36.

The combustion cup 62 includes a cup sidewall 69, a first axial end 70 and a second axial end 72. The first axial end is an open end 70. In the embodiment illustrated, the cup sidewall is a cylindrical sidewall 69. The lid 64 is normally in a closed position relative to the cup sidewall 69 to close the open end 70 of the combustion cup 62. As will be discussed further below, the lid 64 is moveable in an axial direction away from the cup sidewall 69 in response to an increase of pressure within the combustion cup 62 for venting combustion gas out of the combustion cup 62. The axial direction will be understood to be up and down, as shown in the drawings. As with the ignitor cup 46, the combustion cup 62 may be formed of a gas-impermeable material, such as metal.

In the embodiment illustrated, the combustion cup 62 is illustrated to include a first axially extending portion 74 adjacent the first end 70 and a second axially extending portion 76 adjacent the second end 72. The first axially extending portion 74 has a first outer diameter $D_1$ and the second axially extending portion 76 has a second outer diameter $D_2$. The first outer diameter $D_1$ is less than the second outer diameter $D_2$. The cup sidewall 64 includes a tapered portion 78 between the first axially extending portion 74 and the second axially extending portion 76. The tapered portion 78 tapers from the first outer diameter $D_1$ to the second outer diameter $D_2$. In the particular embodiment illustrated, the first outer diameter $D_1$ is approximately 27.8 mm and the second outer diameter $D_2$ is approximately 31 mm The lid 64 includes an end portion 80 and a lid sidewall 82. The lid sidewall 82 extends in the axial direction and radially overlaps with at least a portion of the first axial portion 74 of the combustion cup 62. The lid sidewall 82 has a third outer diameter $D_3$. In certain applications, the third outer diameter $D_3$ is no greater than the first outer diameter $D_1$. In the embodiment illustrated, the third outer diameter $D_3$ is substantially equal to the first outer diameter $D_1$. The lid sidewall 82 has a wall thickness. The second axially extending portion 76 of the combustion cup 62 may be positioned closer to the filter 40 than the thickness of the lid sidewall 82. In this manner, a volume within the combustion cup 62 may be effectively increased to hold a greater amount of the second gas generant material 68. In the embodiment illustrated, the volume of the combustion chamber 66 cooperatively defined by the combustion cup 62 and lid 64.

The second end 72 of the combustion cup 62 is closed by a second igniter device 84. In the embodiment illustrated, the combustion cup 62 is shown to include an axially extending circumferential flange 86 at the second end 72. An end wall 87 radially extending between the axially extending circumferential flange 86 and the second portion 76 of the combustion cup 62. The axially extending circumferential flange 86 defines an opening 88 receiving the second ignitor device 84. The opening 88 has a fourth diameter $D_4$ that is smaller than the first diameter $D_1$. The axially extending circumferential flange 86 is shown to extend away from the second portion 76 of the combustion cup 62. Alternatively, the axially extending circumferential flange 86 may extend into the second portion 76 of the combustion cup 62. The second igniter device 84 is mounted to or mates with the housing 12 through a second squib adapter or holder 90. A second squib seal 92 seals the second squib 84 with the adapter 90.

At least one of the lid 64 and the cup sidewall 69 includes a venting geometry for venting combustion gas from the combustion cup 62. According to the present teachings, at least one of the lid 64 and the cup sidewall 69 may include an axially elongated venting geometry that is gradually revealed in response to movement of the lid 64 away from the cup sidewall 69. The axially elongated venting geometry may be in the form of at least one axially elongated hole 94, at least two axially spaced apart holes 96, and combinations thereof. In the embodiment illustrated, the axially elongated venting geometry is provided in the lid sidewall 82.

Figure 3:
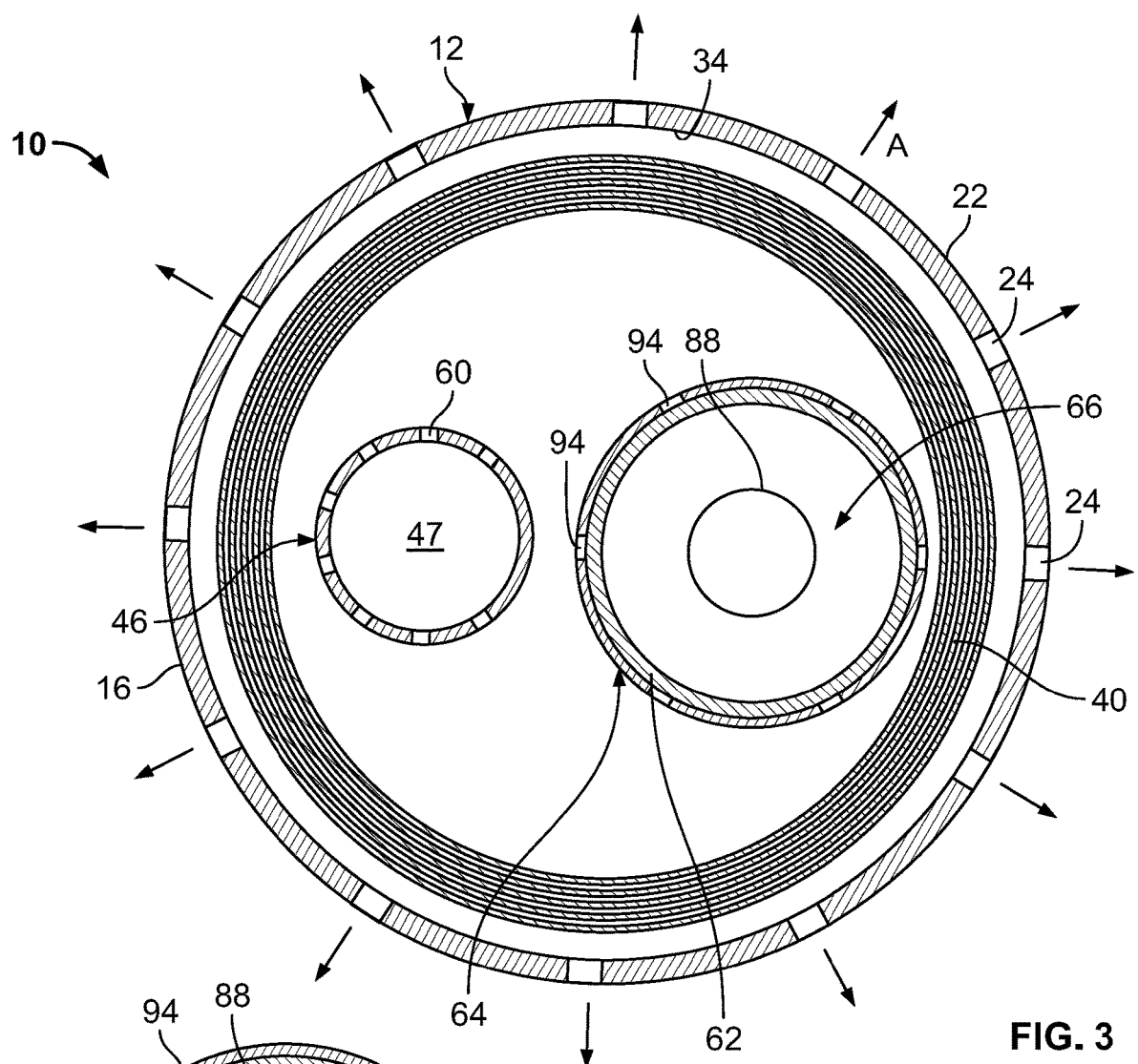
FIG. 3 is a cross-sectional view taken along the line 3-3 of FIG. 1A.
Figure 3A:
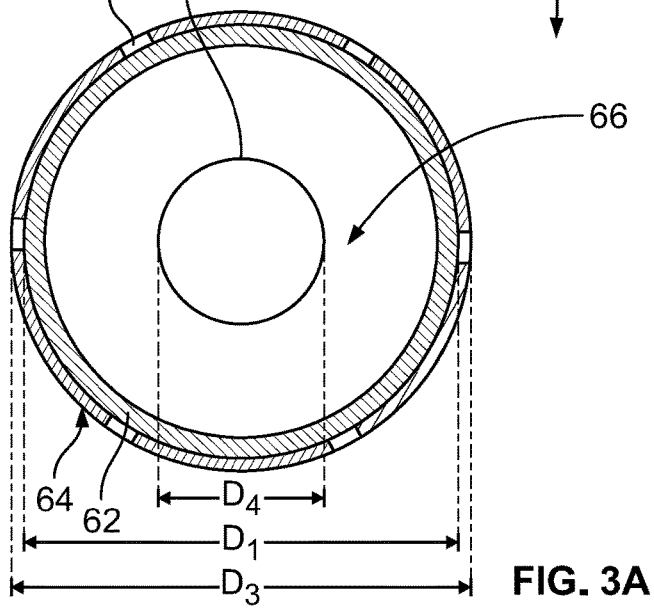
FIG. 3A is an enlarged portion of the cross-sectional view of FIG. 3.
Figure 4:
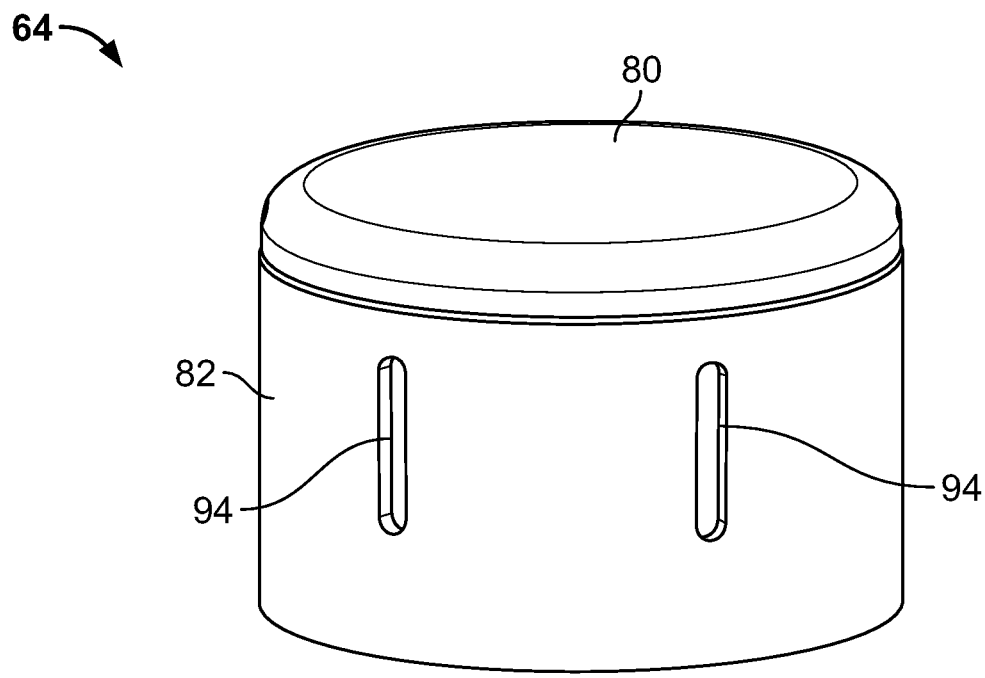
FIG. 4 is a perspective view of a second stage cap of the inflator of FIG. 1.

With particular reference to the cross-sectional views of FIGS. 3 and 3C and to FIG. 4, the lid 64 is illustrated to include a plurality of axially elongated holes 94. In the embodiment illustrated, the lid 64 includes six axially elongated holes 94 equally spaced circumferentially about the lid sidewall 82. In this particular embodiment, the axially elongated holes 94 may be similarly shaped. It will be understood that the lid 64 may include a greater or lesser number of axially elongated holes 94 within the scope of the present teachings. It will also be understood that the holes 94 may be shaped differently or sized differently.

Figure 5:
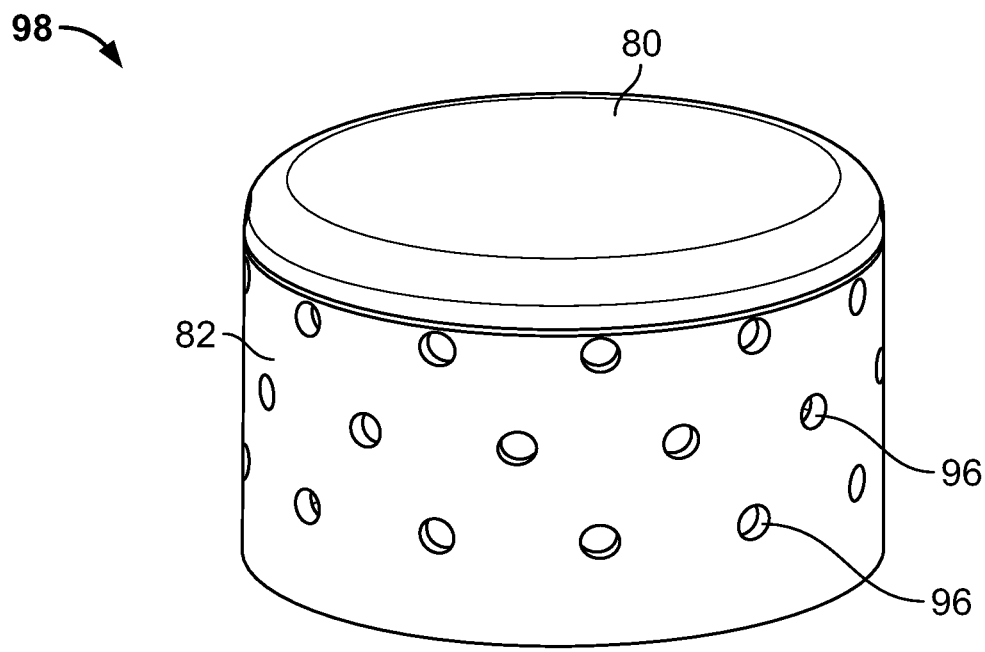
FIG. 5 is a perspective view of an alternative second stage cap for the inflator of FIG. 1.

Turning to FIG. 5, an alternative lid 98 in accordance with the present teachings is illustrated. Distinct from the lid 64, the lid 98 includes an elongated venting geometry in the form of a plurality of axially spaced holes 96. As shown, the holes 96 are circular. Alternatively, the holes 96 may be elongated or of any other shape. The holes 96 may be arranged in circumferentially extending rows. As illustrated, the sidewall 82 of the lid 98 includes three rows of holes. The circumferentially extending rows of holes may axially spaced from one another.

It will be appreciated that an inflator 10 in accordance with the present teachings can provide operation performance in accordance with selected operating conditions as may be required or desired for particular inflatable restraint system installations and applications. More specifically, an inflator 10 of the present teachings can be actuated in a manner such that either or both the quantity or rate of inflation gas production can be appropriately varied, such as at the time of a vehicle crash or collision incident, to take into account one or more conditions of occupant presence. Such inflator performance adaptability results is provided by the two discrete and ballistically isolated chambers of gas generant materials of the inflator 10 of the present teachings.

For example, such an inflator 10 may be operated to have a first stage discharge in which the igniter material 49 is ignited to produce combustion products which are passed to the first chamber 34 to combust the first gas generant material 36. In this manner, inflation gas may be produced at a first output level without actuating or firing the second igniter device 84 or reacting or without activating the gas generant material 68 contained in the second chamber 66. As will be appreciated, such operation may be desired to provide a minimized or reduced inflator output such as may be desired in an instance of a low speed collision, for example. Alternatively, an inflator 10 in accordance with the present teachings may be operated such that both the first and second igniter devices 50 and 84 are actuated.

As will be appreciated, such operation and ignition of both the first and second igniter devices 50 and 84 and first and second gas generant materials 36 and 68 may involve the simultaneous or near simultaneous actuation and firing of the first and second igniter devices 50 and 84. Such simultaneous or near simultaneous actuation may be desired to provide a rapid inflation and deployment of an associated airbag cushion. For example, this rapid inflation and deployment may be desired in response to a high speed or severe vehicle collision. Alternatively, sequential actuation and firing of the first and second igniter devices 50 and 84 may be desired in response to detection of a moderately severe vehicle collision. Further, with such sequential actuation and firing, the time lag or delay between the actuation and firing of the first and second squibs and, in turn, the combustion of the first and second gas generant materials 36 and 68 may be tailored to meet the specific requirements for a particular inflatable restraint system installation, as will be appreciated by those skilled in the art. Thus, such inflator assemblies are particularly suited for application as adaptive output inflators in that they may be made generally dependent on one or more selected operating conditions such as ambient temperature, occupant presence, seat belt usage and rate of deceleration of the motor vehicle, for example.

Figure 6:
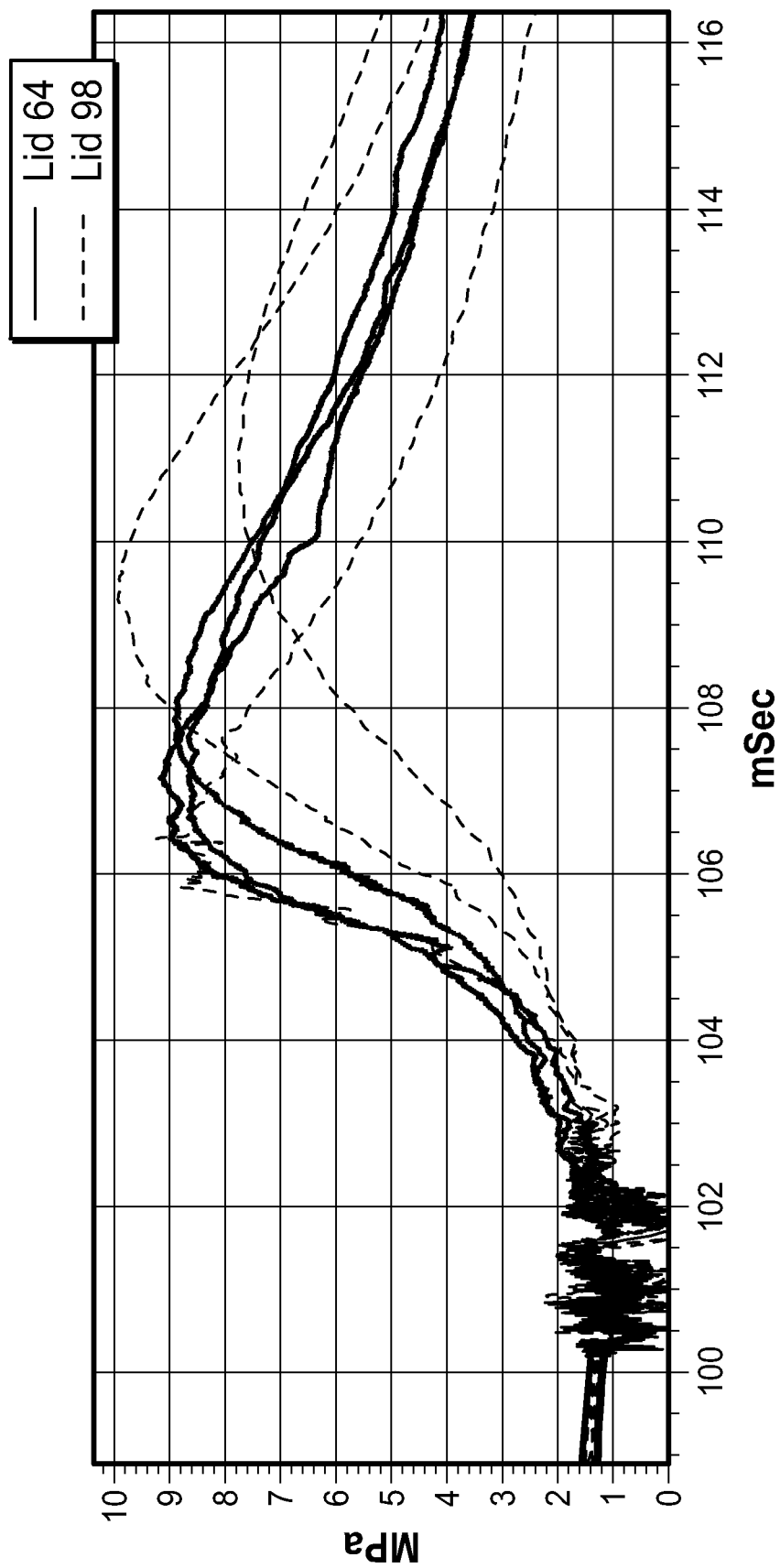
FIG. 6 is a plot of pressure verses time for a combustion chamber including a second stage inflation device.

With actuation of the second igniter device 84, the second gas generant material 68 is combusted to produce reaction products, resulting in an increase in pressure within the cup interior 66. The increase of pressure within the cup interior 66 displaces the lid 64 away from the combustion cup 62 to gradually reveal the elongated venting geometry in the lid sidewall 82. As shown in the FIG. 6 plot of pressure within the combustion chamber 66 verses time, the gradual reveal of the elongated venting geometry functions to longer maintain the pressure within the combustion chamber 66. As a result, the second gas generant material 68 may be more thoroughly combusted and associated effluents are reduced.

Accordingly, the present teachings provide a dual stage inflator 10 having a combustion cup 62 with a lid 80 that has an increased volume for gas generant loading as compared to a conventional combustion cup with a constant diameter. In the particular application described herein, the dual stage inflator 10 of the present teachings may realize an increase in volume of at least 5%, preferably at least 10% and more preferably at least 15%. In one example, the present teachings provided an increase in volume of approximately 19.85%.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. A dual stage inflator for an inflatable vehicle safety device, the dual stage inflator comprising:
   a housing defining a first chamber containing a first gas generant material;
   an ignitor cup disposed in the first chamber and defining an interior containing an ignitor material;
   a first ignitor device extending into the interior of the ignitor cup;
   a combustion cup and a lid disposed in the first chamber and cooperating to define a second chamber containing a second gas generant material, the combustion cup including a cup sidewall extending between a first axial end and a second axial end, the first axial end being an open end, the lid normally in a closed position relative to the combustion cup to close the open end of the combustion cup, the lid moveable away from the combustion cup in response to an increase of pressure within the combustion cup for venting combustion gas out of the combustion cup;
   a second ignitor device extending into the combustion cup and closing the second axial end of the combustion cup; and
   a filter radially between the cup sidewall and the housing
   wherein the combustion cup includes a first axially extending portion adjacent the first axial end having a first outer diameter and a second axially extending portion adjacent the second axial end having a second outer diameter, the first outer diameter being less than the second outer diameter, and
   wherein the lid includes a lid sidewall extending in an axial direction and radially overlapping at least a portion of the combustion cup including the first outer diameter,
   wherein the lid sidewall has a thickness in a radial direction, the second axially extending portion of the combustion cup positioned closer to the filter in the radial direction than the thickness of the lid sidewall.

2. The dual stage inflator of claim 1, wherein the cup sidewall includes a tapered portion between the first axially extending portion and the second axially extending portion.

3. The dual stage inflator of claim 1, wherein the lid sidewall includes a venting geometry for venting combustion gas from the second chamber revealed in response to movement of the lid away from the cup sidewall.

4. The dual stage inflator of claim 1, wherein the cup sidewall has a third outer diameter, the third outer diameter being no greater than the first outer diameter.

5. The dual stage inflator of claim 1, wherein the cup sidewall has a third outer diameter, the third outer diameter being substantially equal to the first outer diameter.

6. The dual stage inflator of claim 1, wherein the combustion cup further includes an axially extending circumferential flange at the second axial end, the axially extending circumferential flange defining an opening receiving the second ignitor device.

7. The dual stage inflator of claim 6, wherein the axially extending circumferential flange extends away from the second axially extending portion of the combustion cup.

8. The dual stage inflator of claim 6, wherein the opening defined by the axially extending circumferential flange has a fourth diameter, the fourth diameter being smaller than the first outer diameter.

9. The dual stage inflator of claim 6, wherein the combustion cup further includes an end wall radially extending between the axially extending circumferential flange and the second axially extending portion.

10. An inflator for an inflatable vehicle safety device, the inflator comprising:
    a cup including a cup sidewall and an open end, the cup sidewall extending between a first axial end and a second axial end;
    a lid cooperating with the cup sidewall to define a combustion chamber, the lid normally closing the combustion chamber and movable away from the cup sidewall to vent combustion gas from the combustion chamber;
    a gas generant disposed in the combustion chamber; and
    an ignition device extending into the combustion chamber;
    wherein the cup includes a first axially extending portion adjacent the first axial end having a first outer diameter and a second axially extending portion adjacent the second axial end having a second outer diameter, the first out outer diameter being less than the second outer diameter,
    wherein the lid includes an axially extending lid sidewall extending in an axial direction and radially overlapping at least a portion of the cup including the first outer diameter, and
    wherein the lid has a maximum lid outer diameter, the maximum lid outer diameter no greater than the second outer diameter.

11. The inflator of claim 10, wherein the cup sidewall includes a tapered portion between the first axially extending portion and the second axially extending portion.

12. The inflator of claim 10, wherein the lid sidewall includes a venting geometry for venting combustion gas from the second chamber revealed in response to movement of the lid away from the cup sidewall.

13. The inflator of claim 10, wherein the cup further includes an axially extending circumferential flange at the second axial end, the axially extending circumferential flange defining an opening receiving the second ignitor device.

14. The inflator of claim 13, wherein the axially extending circumferential flange extends away from the second axially extending portion of the cup.

15. The inflator of claim 13, wherein the opening defined by the axially extending circumferential flange has a fourth diameter, the fourth diameter being smaller than the first outer diameter.

16. The inflator of claim 13, wherein the cup further includes an end wall radially extending between the axially extending circumferential flange and the second axially extending portion.

17. A dual stage inflator for an inflatable vehicle safety device, the dual stage inflator comprising:
   a housing defining a first chamber containing a first gas generant material;
   an ignitor cup disposed in the first chamber and defining an interior containing an ignitor material;
   a first ignitor device extending into the interior of the ignitor cup;
   a combustion cup and a lid disposed in the first chamber and cooperating to define a second chamber containing a second gas generant material, the combustion cup including a cup sidewall extending between a first axial end and a second axial end, the first axial end being an open end, the lid normally in a closed position relative to the combustion cup to close the open end of the combustion cup, the lid moveable away from the combustion cup in response to an increase of pressure within the combustion cup for venting combustion gas out of the combustion cup; and
   a second ignitor device extending into the combustion cup and closing the second axial end of the combustion cup;
   wherein the combustion cup includes a first axially extending portion adjacent the first axial end having a first outer diameter and a second axially extending portion adjacent the second axial end having a second outer diameter, the first outer diameter being less than the second outer diameter,
   wherein the lid includes a lid sidewall extending in an axial direction and radially overlapping at least a portion of the combustion cup including the first outer diameter, the lid axially extending along the first axially extending portion and terminating before the second axially extending portion.

* * * * *